United States Patent
Sharafi et al.

(10) Patent No.: US 11,848,434 B1
(45) Date of Patent: Dec. 19, 2023

(54) MULTIFUNCTIONAL METAL-ORGANIC FRAMEWORK BATTERY INTERFACE

(71) Applicant: Rivian IP Holdings, LLC, Plymouth, MI (US)

(72) Inventors: Asma Sharafi, Foster City, CA (US); Prajanya Sunil Kendrekar, San Jose, CA (US); Jinyong Kim, San Jose, CA (US); Susheel Teja Gogineni, Sunnyvale, CA (US)

(73) Assignee: Rivian IP Holdings, LLC, Irvine, CA (US)

(*) Notice: Subject to any disclaimer, the term of this patent is extended or adjusted under 35 U.S.C. 154(b) by 0 days.

(21) Appl. No.: 18/146,809

(22) Filed: Dec. 27, 2022

(51) Int. Cl.
| | |
|---|---|
| H01M 10/6557 | (2014.01) |
| H01M 10/658 | (2014.01) |
| H01M 10/6563 | (2014.01) |
| H01M 50/218 | (2021.01) |
| H01M 10/613 | (2014.01) |
| H01M 10/625 | (2014.01) |
| H01M 50/249 | (2021.01) |
| H01M 50/242 | (2021.01) |

(52) U.S. Cl.
CPC ..... H01M 10/6557 (2015.04); H01M 10/658 (2015.04); H01M 10/6563 (2015.04); H01M 50/218 (2021.01); H01M 50/242 (2021.01); *H01M 10/613* (2015.04); *H01M 10/625* (2015.04); *H01M 50/249* (2021.01); *H01M 2220/20* (2013.01)

(58) Field of Classification Search
None
See application file for complete search history.

(56) References Cited

U.S. PATENT DOCUMENTS

| | | | | |
|---|---|---|---|---|
| 2010/0104927 | A1* | 4/2010 | Albright | B60L 50/64 |
| | | | | 429/50 |
| 2013/0171493 | A1* | 7/2013 | Wayne | H01M 10/6557 |
| | | | | 165/104.19 |
| 2013/0283846 | A1* | 10/2013 | Baumann | F25B 17/083 |
| | | | | 62/476 |
| 2016/0359211 | A1* | 12/2016 | Kenney | H01M 10/6557 |
| 2021/0163303 | A1* | 6/2021 | Evans | B32B 5/024 |
| 2022/0059901 | A1 | 2/2022 | Ren et al. | |

FOREIGN PATENT DOCUMENTS

| | | | | |
|---|---|---|---|---|
| CN | 111740056 A | * | 10/2020 | ......... H01M 10/613 |
| CN | 114497826 A | * | 5/2022 | |

* cited by examiner

*Primary Examiner* — Basia A Ridley
*Assistant Examiner* — Heng M. Chan
(74) *Attorney, Agent, or Firm* — Foley & Lardner LLP

(57) ABSTRACT

The present solution provides a multifunctional metal-organic (MOF) interface that can be applied between battery cells, battery modules or battery packs and provide thermal isolation and active cooling, as necessary, while also providing absorption for mechanical stress of EV battery. The present solution can include a battery cell that can have an outer surface. A multifunctional material can be coupled with the outer surface of the battery cell. An opening that extends through the multifunctional material can provide thermal convection when the heat is moved through the opening. The multifunctional material can provide thermal insulation when the fluid is not moved through the opening. The multifunctional material can insulate the battery cell from mechanical stress.

20 Claims, 11 Drawing Sheets

MULTIFUNCTIONAL METAL-ORGANIC FRAMEWORK BATTERY INTERFACE

INTRODUCTION

Electric vehicles (EVs) can use energy stored in batteries to power electric motors and produce motion. The batteries can include different design structures and components facilitating the energy storage. These design features can affect the battery quality and performance.

SUMMARY

The present solution presents a multifunctional metal-organic framework (MOF) interface that can provide thermal management in the form of thermal insulation or cooling via thermal conduction and forced convection, while also absorbing mechanical energy (e.g., vibrations or mechanical pressure) in the battery pack and increasing the energy density of the battery. Thermal management and mechanical stress absorption can improve the performance and longevity of the EV batteries. The multifunctional interface of the present solution can be fabricated from mesoporous MOF material and disposed between battery cells and modules. The opening can be tubular with different cross section, dependent on the modeling. The cross-section can be optimized to be circular, hexagonal or have any other geometry to provide the desired flow. The multifunctional material can include an array of elongate through-hole tubular openings extending through the multifunctional material to allow for fluid (e.g., gas or liquid) to be forced through the openings in order to provide forced convection cooling for the battery. The MOF can include porous features that provide thermal insulation between the battery cells, and modules when fluid is not forced through the openings. The MOF structure can be designed so that some of the channels are filled with the cooling fluids (coolant) and some that remain empty. The empty channels can provide a potential to accommodate the volume changes and act as a buffer layer, while channels that are filled with coolant are used for thermal management. The MOF can also provide mechanical energy absorption in the form of a damper (e.g., a nano-damper), such as a shock absorber, a vibration dampener or otherwise an interface that absorbs mechanical energy, such as a compression, without any further energy release, providing benefits in the event of sudden high momentum actions, such as strong deceleration or impact. The shock absorption can help during sudden high momentum actions, any vibration loads applied to vehicle due to dynamic load that may be applied to the EV due to road anomalies and any volume changes that can be experienced in the battery cells due to the cycling and expansion in the electrodes.

At least one aspect is directed to an apparatus. The apparatus includes a battery cell having an outer surface. The apparatus includes a multifunctional material coupled with the outer surface. The apparatus includes an opening that extends through the multifunctional material.

At least one aspect is directed to a method. The method can include providing a multifunctional material. The method can include forming an opening extending through the multifunctional material. The method can include thermally coupling the multifunctional material with a battery cell. The method can include providing a fluid moving device configured to move a fluid through the opening.

At least one aspect is directed to an electric vehicle. The electric vehicle can include a battery pack of an electric vehicle. The battery pack can include a first battery cell having a first outer surface. The battery pack can include a second battery cell having a second outer surface. The battery pack can include a multifunctional material disposed between the first outer surface and the second outer surface. The interface can be in thermal communication with the first battery cell and the second battery cell. A plurality of openings can extend through the multifunctional material from a first plurality of ends of the plurality of openings at a first end of the multifunctional material to a second plurality of ends of the plurality of openings at a second end of the multifunctional material. The multifunctional material can be configured to conduct heat away from at least one of the first battery cell or the second battery cell in response to a fluid being moved through the plurality of openings by a fluid moving device. The multifunctional material can be configured to provide thermal insulation to at least one of the first battery cell or the second battery cell in response to the fluid not being moved through the plurality of openings by the fluid moving device. The multifunctional material can be configured to absorb mechanical energy from at least one of the first battery cell or the second battery cell.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
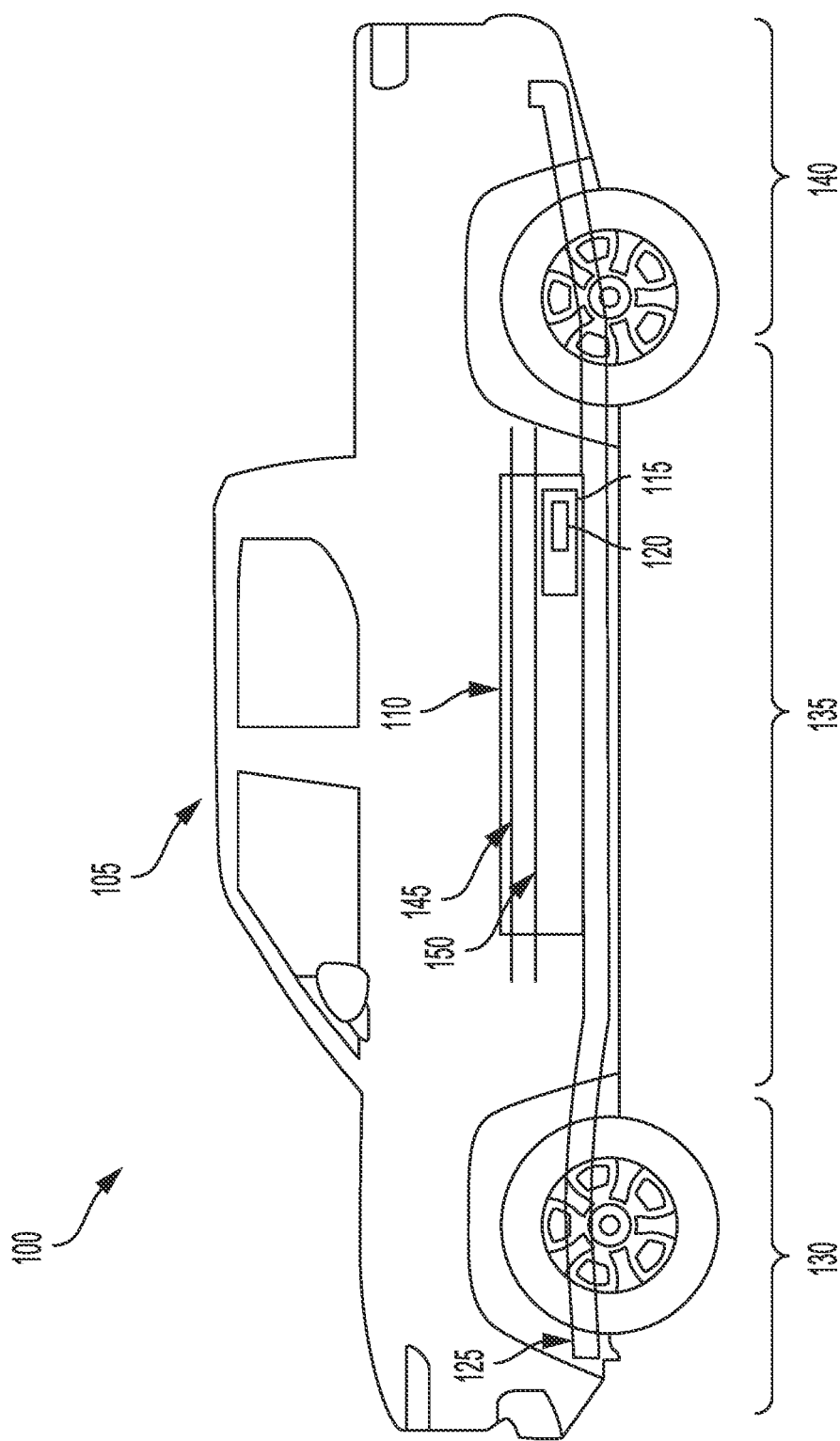
FIG. 1 depicts an example electric vehicle.

Following below are more detailed descriptions of various concepts related to, and implementations of, methods, apparatuses, and systems of multifunctional metal-organic battery interface that can be deployed at any level of the EV battery, including the battery cell level, the battery module level or the battery pack level. The various concepts introduced above and discussed in greater detail below may be implemented in any of numerous ways.

While operating an EV, some parts of the EV, including an EV battery, can generate heat. Unless dissipated, the generated heat can accumulate and adversely affect the performance and longevity of the battery. In addition, the battery may receive heat from different surrounding heat sources, such as other parts of the EV or the environment. While thermally insulating the EV battery from external heat sources and conducting the generated heat away from the battery can improve the battery performance and longevity, doing so can within the constraints of the EV can be challenging. At the same time, any one or more parts (e.g., battery cells, modules or packs) of the EV battery can be subject to mechanical stress as a result of the EV operation, including vibrations, compressions, shock or pressure, which can also adversely affect the EV battery unless such mechanical stresses are absorbed or dampened. During cell cycling, the battery cell in pack structure can experience volume changes. The MOF structure of the present solution can act as a compression pad to not only apply the compressions to the battery, but also act as buffer layer to accommodate the volume changes that can be experienced during operation, such as a volume change of about 2-5% in case of Li-ion batteries, and about 15-25% in case of solid-state batteries.

The present solution provides a multifunctional metal-organic (MOF) interface that can be applied between battery cells, battery modules and provide both thermal isolation and active cooling, as necessary, while also absorbing various mechanical stresses to which the EV battery and its components are subject. The present solution can include a MOF interface structure that can provide a combination of heat conduction and active convection cooling (e.g., via a forced fluid movement through tubular openings extending through the multifunctional material) for the battery and its components, while also providing thermal insulation between the battery and its components and external heat sources when no fluid is moved through the openings of the MOF interface structure. The present solution can also provide the same MOF interface structure for mechanical stress absorption (e.g., absorption or dampening of vibration, pressure, swelling or shock) when the MOF interface structure is disposed, around or between one or more battery cells, battery modules or battery packs of the EV. As the MOF interface structure can occupy a small amount of volume in the battery (e.g., have thickness on the order of about 1 mm or less), the present solution can simultaneously provide thermal and mechanical stress solutions, while improving the overall EV battery energy density. The implementation of the MOF structure can help with the simplifying the battery pack assembly by reducing the number of parts for assembling the battery modules and packs, as well as reducing the cost of the batteries and the packs assembled.

For example, the present solution can utilize a mesoporous MOF material-based interface in which an array of elongate through-hole openings can be formed, extending through the multifunctional material to provide tubular openings or channels for convection cooling. Due to its properties and design, the multifunctional material can provide up to, or more than, 78000 m2/g of surface area. The multifunctional material can provide thermal conduction away from the heat generating batteries (e.g., cells, modules) through the MOF material and then away from the system through forced fluid convection cooling through the through-hole openings in the multifunctional material that can be forced or pumped by a fluid moving device. When no forced convection is applied, the thermal conduction can be impeded and the multifunctional material can provide thermal insulation to the battery or its components from various external heat sources. Likewise, the multifunctional material can provide mechanical stress or energy absorption in the form of a damper (e.g., a nano-damper), a shock absorber, or otherwise an interface for absorbing mechanical energy without energy release, which can be beneficial in high deceleration, momentum or impact situations. Due to the design of channels in the structure, the channel walls can be deformed inward to absorb the swelling of the battery cells, battery modules or packs during the EV battery operation to accommodate the changes in the volume of the EV battery during the battery operation.

FIG. 1 depicts an example cross-sectional view 100 of an electric vehicle 105 installed with at least one battery pack 110. Electric vehicles 105 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The battery pack 110 can also be used as an energy storage system to power a building, such as a residential home or commercial building. Electric vehicles 105 can be fully electric or partially electric (e.g., plug-in hybrid) and further, electric vehicles 105 can be fully autonomous, partially autonomous, or unmanned. Electric vehicles 105 can also be human operated or non-autonomous. Electric vehicles 105 such as electric trucks or automobiles can include on-board battery packs 110, batteries or battery modules 115, or battery cells 120 to power the electric vehicles. The electric vehicle 105 can include a chassis 125 (e.g., a frame, internal frame, or support structure). The chassis 125 can support various components of the electric vehicle 105. The chassis 125 can span a front portion 130 (e.g., a hood or bonnet portion), a body portion 135, and a rear portion 140 (e.g., a trunk, payload, or boot portion) of the electric vehicle 105. The battery pack 110 can be installed or placed within the electric vehicle 105. For example, the battery pack 110 can be installed on the chassis 125 of the electric vehicle 105 within one or more of the front portion 130, the body portion 135, or the rear portion 140. The battery pack 110 can include or connect with at least one busbar, e.g., a current collector element. For example, the first busbar 145 and the second busbar 150 can include electrically conductive material to connect or otherwise electrically couple the battery, the battery modules 115, or the battery cells 120 with other electrical components of the electric vehicle 105 to provide electrical power to various systems or components of the electric vehicle 105.

Figure 2A:
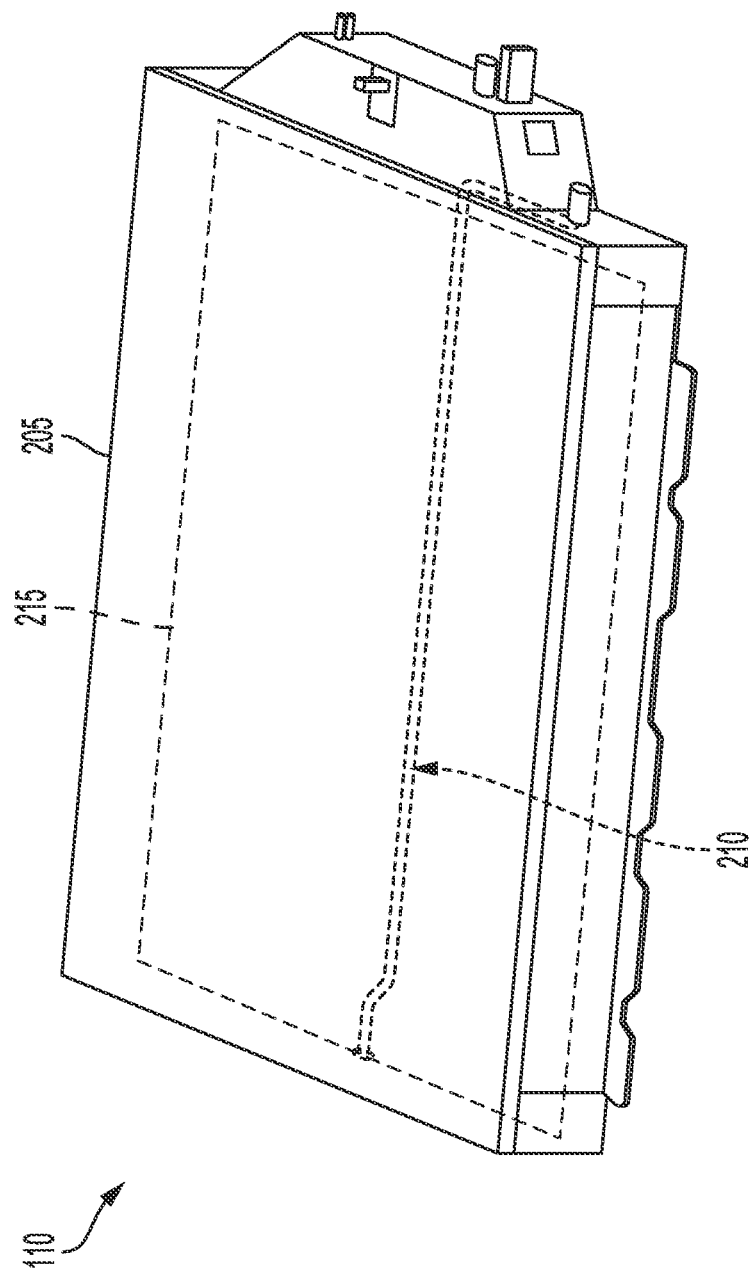
FIG. 2A depicts an example of a battery pack.

FIG. 2A depicts an example battery pack 110. Referring to FIG. 2A, among others, the battery pack 110 can provide power to electric vehicle 105. Battery packs 110 can include any arrangement or network of electrical, electronic, mechanical or electromechanical devices to power a vehicle of any type, such as the electric vehicle 105. The battery pack 110 can include at least one housing 205. The housing 205 can include at least one battery module 115 or at least one battery cell 120, as well as other battery pack components. The battery module 115 can be or can include one or more groups of prismatic cells, cylindrical cells, pouch cells, or other form factors of battery cells 120. The housing 205 can include a shield on the bottom or underneath the battery module 115 to protect the battery module 115 and/or cells 120 from external conditions, for example if the electric vehicle 105 is driven over rough terrains (e.g., off-road, trenches, rocks, etc.) The battery pack 110 can include at least one cooling line 210 that can distribute fluid through the battery pack 110 as part of a thermal/temperature control or heat exchange system that can also include at least one thermal component (e.g., cold plate) 215. The thermal component 215 can be positioned in relation to a top submodule and a bottom submodule, such as in between the top and bottom submodules, among other possibilities. The battery pack 110 can include any number of thermal components 215. For example, there can be one or more thermal components 215 per battery pack 110, or per battery module 115. At least one cooling line 210 can be coupled with, part of, or independent from the thermal component 215.

Figure 2B:
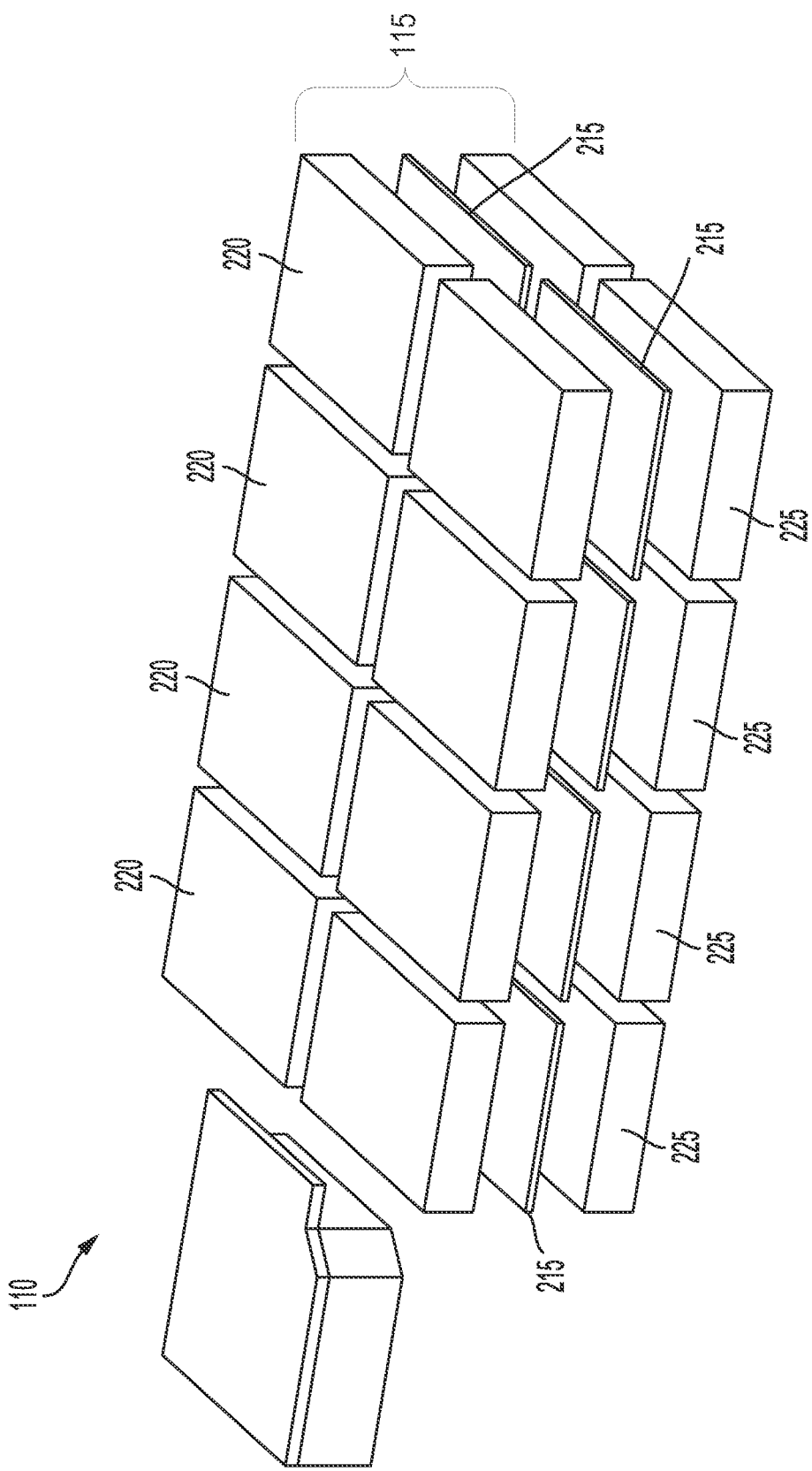
FIG. 2B depicts an example of a battery module.
Figure 2C:
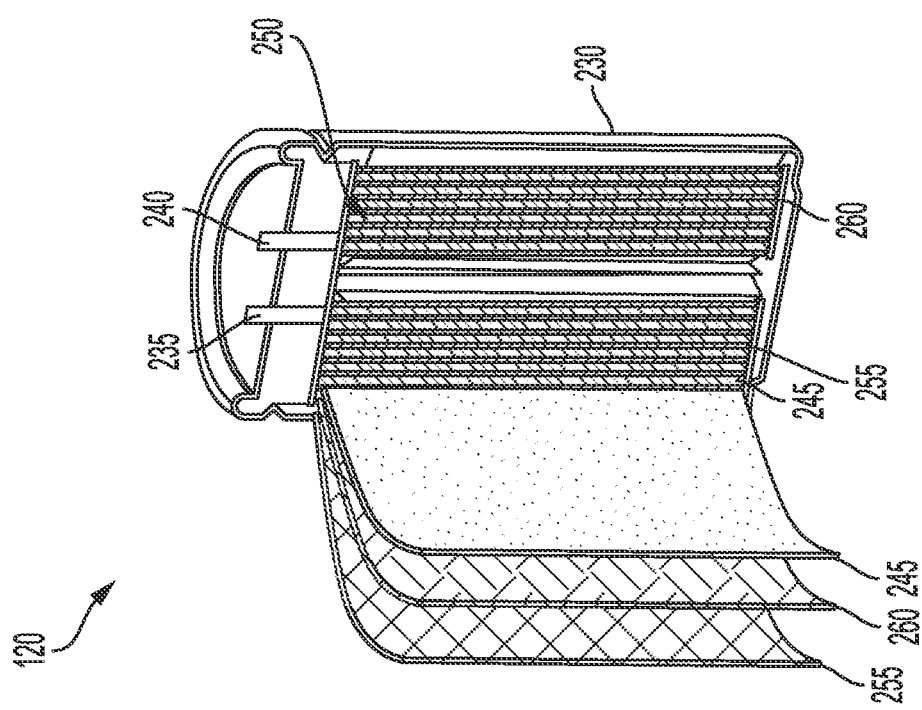
FIG. 2C depicts a cross sectional view of an example of a battery cell.
Figure 2D:
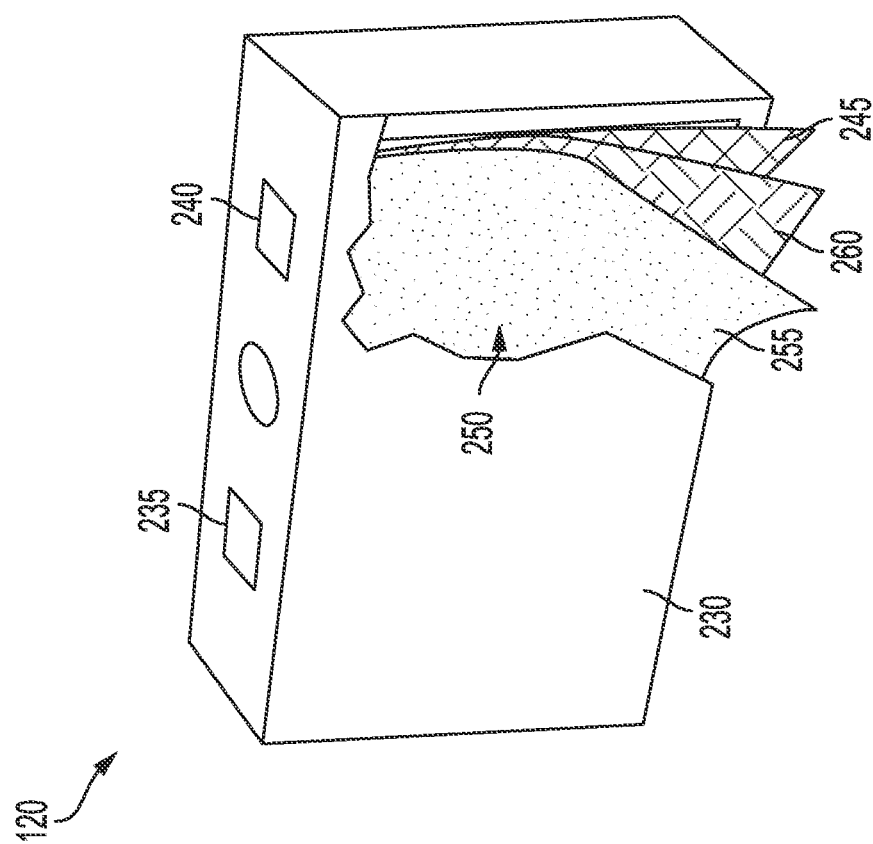
FIG. 2D depicts a cross sectional view of another example of a battery cell.
Figure 2E:
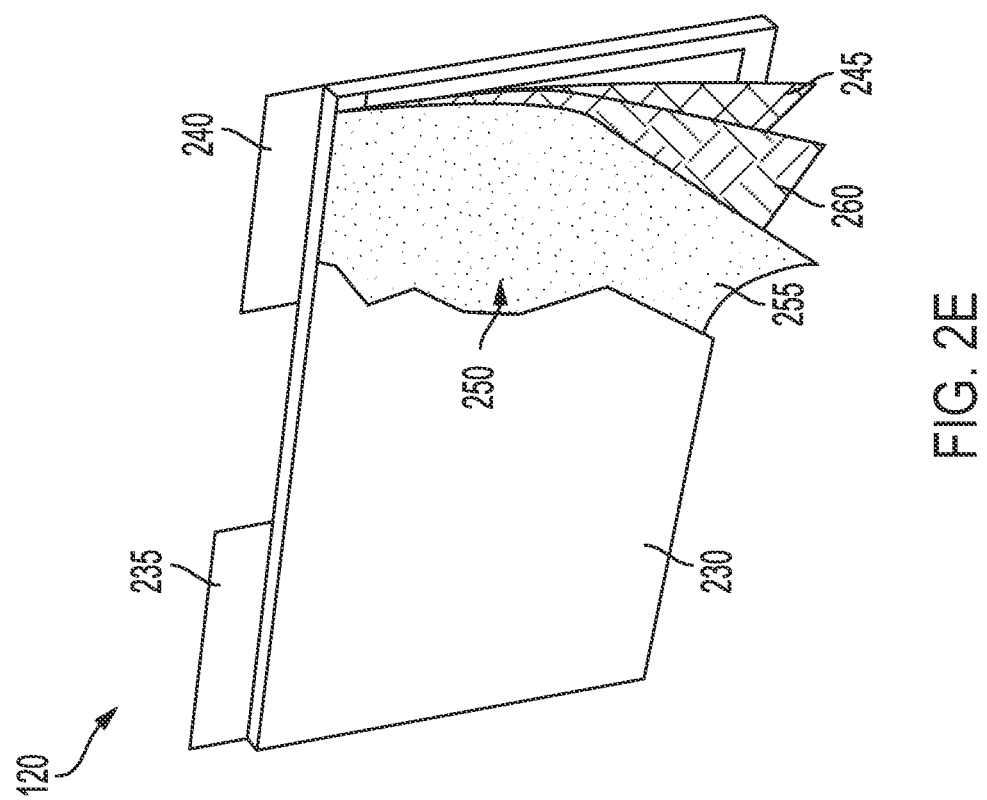
FIG. 2E depicts a cross sectional view of another example of a battery cell.

FIG. 2B depicts example battery modules 115, and FIGS. 2C, 2D and 2E depict an example cross sectional view of a battery cell 120. The battery modules 115 can include at least one submodule. For example, the battery modules 115 can include at least one first (e.g., top) submodule 220 or at least one second (e.g., bottom) submodule 225. At least one thermal component 215 can be disposed between the top submodule 220 and the bottom submodule 225. For example, one thermal component 215 can be configured for heat exchange with one battery module 115. The thermal component 215 can be disposed or thermally coupled between the top submodule 220 and the bottom submodule 225. One thermal component 215 can also be thermally coupled with more than one battery module 115 (or more than two submodules 220, 225). The thermal components 215 shown adjacent to each other can be combined into a single thermal component 215 that spans the size of one or more submodules 220 or 225. The thermal component 215 can be positioned underneath submodule 220 and over submodule 225, in between submodules 220 and 225, on one or more sides of submodules 220, 225, among other possibilities. The thermal component 215 can be disposed in sidewalls, cross members, structural beams, among various other components of the battery pack, such as battery pack 110 described above. The battery submodules 220, 225 can collectively form one battery module 115. In some examples each submodule 220, 225 can be considered as a complete battery module 115, rather than a submodule.

The battery modules 115 can each include a plurality of battery cells 120. The battery modules 115 can be disposed within the housing 205 of the battery pack 110. The battery modules 115 can include battery cells 120 that are cylindrical cells or prismatic cells, for example. The battery module 115 can operate as a modular unit of battery cells 120. For example, a battery module 115 can collect current or electrical power from the battery cells 120 that are included in the battery module 115 and can provide the current or electrical power as output from the battery pack 110. The battery pack 110 can include any number of battery modules 115. For example, the battery pack can have one, two, three, four, five, six, seven, eight, nine, ten, eleven, twelve or other number of battery modules 115 disposed in the housing 205. It should also be noted that each battery module 115 may include a top submodule 220 and a bottom submodule 225, possibly with a thermal component 215 in between the top submodule 220 and the bottom submodule 225. The battery pack 110 can include or define a plurality of areas for positioning of the battery module 115 and/or cells 120. The battery modules 115 can be square, rectangular, circular, triangular, symmetrical, or asymmetrical. In some examples, battery modules 115 may be different shapes, such that some battery modules 115 are rectangular but other battery modules 115 are square shaped, among other possibilities. The battery module 115 can include or define a plurality of slots, holders, or containers for a plurality of battery cells 120. It should be noted the illustrations and descriptions herein are provided for example purposes and should not be interpreted as limiting. For example, the battery cells 120 can be inserted in the battery pack 110 without battery modules 220 and 225. The battery cells 120 can be disposed in the battery pack 110 in a cell-to-pack configuration without modules 220 and 225, among other possibilities.

Battery cells 120 have a variety of form factors, shapes, or sizes. For example, battery cells 120 can have a cylindrical, rectangular, square, cubic, flat, pouch, elongated or prismatic form factor. As depicted in FIG. 2C, for example, the battery cell 120 can be cylindrical. As depicted in FIG. 2D, for example, the battery cell 120 can be prismatic. As depicted in FIG. 2E, for example, the battery cell 120 can include a pouch form factor. Battery cells 120 can be assembled, for example, by inserting a winded or stacked electrode roll (e.g., a jelly roll) including electrolyte material into at least one battery cell housing 230. The electrolyte material, e.g., an ionically conductive fluid or other material, can support electrochemical reactions at the electrodes to generate, store, or provide electric power for the battery cell by allowing for the conduction of ions between a positive electrode and a negative electrode. The battery cell 120 can include an electrolyte layer where the electrolyte layer can be or include solid electrolyte material that can conduct ions. For example, the solid electrolyte layer can conduct ions without receiving a separate liquid electrolyte material. The electrolyte material, e.g., an ionically conductive fluid or other material, can support conduction of ions between electrodes to generate or provide electric power for the battery cell 120. The housing 230 can be of various shapes, including cylindrical or rectangular, for example. Electrical connections can be made between the electrolyte material and components of the battery cell 120. For example, electrical connections to the electrodes with at least some of the electrolyte material can be formed at two points or areas of the battery cell 120, for example to form a first polarity terminal 235 (e.g., a positive or anode terminal) and a second polarity terminal 240 (e.g., a negative or cathode terminal). The polarity terminals can be made from electrically conductive materials to carry electrical current from the battery cell 120 to an electrical load, such as a component or system of the electric vehicle 105.

For example, the battery cell 120 can include at least one lithium-ion battery cell. In lithium-ion battery cells, lithium ions can transfer between a positive electrode and a negative electrode during charging and discharging of the battery cell. For example, the battery cell anode can include lithium or graphite (e.g., Si anode, composites or any other LTO, based anode chemistries), and the battery cell cathode can include a lithium-based oxide material (e.g., NMC, LCO, LFP, LMFP conversion cathode). The electrolyte material can be disposed in the battery cell 120 to separate the anode and cathode from each other and to facilitate transfer of lithium ions between the anode and cathode. It should be noted that battery cell 120 can also take the form of a solid state battery cell developed using solid electrodes and solid electrolytes. Solid electrodes or electrolytes can be or include inorganic solid electrolyte materials (e.g., oxides, sulfides, phosphides, ceramics), solid polymer electrolyte materials, hybrid solid state electrolytes, or combinations thereof. In some embodiments, the solid electrolyte layer can include polyanionic or oxide-based electrolyte material (e.g., Lithium Superionic Conductors (LISICONs), Sodium Superionic Conductors (NASICONs), perovskites with formula $ABO_3$ (A=Li, Ca, Sr, La, and B=Al, Ti), garnet-type with formula $A_3B_2(XO_4)_3$ (A=Ca, Sr, Ba and X=Nb, Ta), lithium phosphorous oxynitride ($Li_xPO_yN_z$). In some embodiments, the solid electrolyte layer can include a glassy, ceramic and/or crystalline sulfide-based electrolyte (e.g., $Li_3PS_4$, $Li_7P_3S_{11}$, $Li_2S$—$P_2S_5$, $Li_2S$—$B_2S_3$, $SnS$—$P_2S_5$, $Li_2S$—$SiS_2$, $Li_2S$—$P_2S_5$, $Li_2S$—$GeS_2$, $Li_{10}GeP_2S_{12}$) and/or sulfide-based lithium argyrodites with formula $Li_6PS_5X$ (X=Cl, Br) like $Li_6PS_5Cl$). Furthermore, the solid electrolyte layer can include a polymer electrolyte material (e.g., a hybrid or pseudo-solid state electrolyte), for example, polyacrylonitrile (PAN), polyethylene oxide (PEO), polymethyl-methacrylate (PMMA), and polyvinylidene fluoride (PVDF), among others.

The battery cell 120 can be included in battery modules 115 or battery packs 110 to power components of the electric vehicle 105. The battery cell housing 230 can be disposed in the battery module 115, the battery pack 110, or a battery array installed in the electric vehicle 105. The housing 230 can be of any shape, such as cylindrical with a circular (e.g., as depicted in FIG. 2C, among others), elliptical, or ovular base, among others. The shape of the housing 230 can also be prismatic with a polygonal base, as shown in FIG. 2D, among others. As shown in FIG. 2E, among others, the housing 230 can include a pouch form factor. The housing 230 can include other form factors, such as a triangle, a square, a rectangle, a pentagon, and a hexagon, among others. In some embodiments, the battery pack may not include modules (e.g., module-free). For example, the battery pack can have a module-free or cell-to-pack configuration where the battery cells are arranged directly into a battery pack without assembly into a module.

The housing 230 of the battery cell 120 can include one or more materials with various electrical conductivity or thermal conductivity, or a combination thereof. The electrically conductive and thermally conductive material for the housing 230 of the battery cell 120 can include a metallic material, such as aluminum, an aluminum alloy with copper, silicon, tin, magnesium, manganese, or zinc (e.g., aluminum 1000, 4000, or 5000 series), iron, an iron-carbon alloy (e.g., steel), silver, nickel, copper, and a copper alloy, among others. The electrically insulative and thermally conductive material for the housing 230 of the battery cell 120 can include a ceramic material (e.g., silicon nitride, silicon carbide, titanium carbide, zirconium dioxide, beryllium oxide, and among others) and a thermoplastic material (e.g., polyethylene, polypropylene, polystyrene, polyvinyl chloride, or nylon), among others. In examples where the housing 230 of the battery cell 120 is prismatic (e.g., as depicted in FIG. 2D, among others) or cylindrical (e.g., as depicted in FIG. 2C, among others), the housing 230 can include a rigid or semi-rigid material such that the housing 230 is rigid or semi-rigid (e.g., not easily deformed or manipulated into another shape or form factor). In examples where the housing 230 includes a pouch form factor (e.g., as depicted in FIG. 2E, among others), the housing 230 can include a flexible, malleable, or non-rigid material such that the housing 230 can be bent, deformed, manipulated into another form factor or shape.

The battery cell 120 can include at least one anode layer 245, which can be disposed within the cavity 250 defined by the housing 230. The anode layer 245 can include a first redox potential. The anode layer 245 can receive electrical current into the battery cell 120 and output electrons during the operation of the battery cell 120 (e.g., charging or discharging of the battery cell 120). The anode layer 245 can include an active substance. The active substance can include, for example, an activated carbon or a material infused with conductive materials (e.g., artificial or natural graphite, or blended), lithium titanate ($Li_4Ti_5O_{12}$), or a silicon-based material (e.g., silicon metal, oxide, carbide, pre-lithiated), or other lithium alloy anodes (Li—Mg, Li—Al, Li—Ag alloy etc.) or composite anodes consisting of lithium and carbon, silicon and carbon or other compounds. The active substance can include graphitic carbon (e.g., ordered or disordered carbon with $sp^2$ hybridization), Li metal anode, or a silicon-based carbon composite anode, or other lithium alloy anodes (Li—Mg, Li—Al, Li—Ag alloy etc.) or composite anodes consisting of lithium and carbon, silicon and carbon or other compounds. In some examples, an anode material can be formed within a current collector material. For example, an electrode can include a current collector (e.g., a copper foil) with an in situ-formed anode (e.g., Li metal) on a surface of the current collector facing the separator or solid-state electrolyte. In such examples, the assembled cell does not comprise an anode active material in an uncharged state.

The battery cell 120 can include at least one cathode layer 255 (e.g., a composite cathode layer compound cathode layer, a compound cathode, a composite cathode, or a cathode). The cathode layer 255 can include a second redox potential that can be different than the first redox potential of the anode layer 245. The cathode layer 255 can be disposed within the cavity 250. The cathode layer 255 can output electrical current out from the battery cell 120 and can receive electrons during the discharging of the battery cell 120. The cathode layer 255 can also receive lithium ions during the discharging of the battery cell 120. Conversely, the cathode layer 255 can receive electrical current into the battery cell 120 and can output electrons during the charging of the battery cell 120. The cathode layer 255 can release lithium ions during the charging of the battery cell 120.

The battery cell 120 can include an electrolyte layer 260 disposed within the cavity 250. The electrolyte layer 260 can be arranged between the anode layer 245 and the cathode layer 255 to separate the anode layer 245 and the cathode layer 255. A separator can be wetted with a liquid electrolyte. The liquid electrolyte can be diffused into the anode layer 245. The liquid electrolyte can be diffused into the cathode layer 255. The electrolyte layer 260 can help transfer ions between the anode layer 245 and the cathode layer 255. The electrolyte layer 260 can transfer Li' cations from the anode layer 245 to the cathode layer 255 during the discharge operation of the battery cell 120. The electrolyte layer 260 can transfer lithium ions from the cathode layer 255 to the anode layer 245 during the charge operation of the battery cell 120.

The redox potential of layers (e.g., the first redox potential of the anode layer 245 or the second redox potential of the cathode layer 255) can vary based on a chemistry of the respective layer or a chemistry of the battery cell 120. For example, lithium-ion batteries can include an LFP (lithium iron phosphate) chemistry, an LMFP (lithium manganese iron phosphate) chemistry, an NMC (Nickel Manganese Cobalt) chemistry, an NCA (Nickel Cobalt Aluminum) chemistry, an OLO (Over Lithiated Oxide) chemistry, or an LCO (lithium cobalt oxide) chemistry for a cathode layer (e.g., the cathode layer 255). Lithium-ion batteries can include a graphite chemistry, a silicon-graphite chemistry, or a lithium metal chemistry for the anode layer (e.g., the anode layer 245).

For example, lithium-ion batteries can include an olivine phosphate ($LiMPO_4$, M=Fe and/or Co and/or Mn and/or Ni)) chemistry, LISICON or NASICON Phosphates ($Li_3M_2(PO_4)_3$ and $LiMPO_4O_x$, M=Ti, V, Mn, Cr, and Zr), for example lithium iron phosphate (LFP), lithium iron manganese phosphate (LMFP), layered oxides ($LiMO_2$, M=Ni and/or Co and/or Mn and/or Fe and/or Al and/or Mg) examples, NMC (Nickel Manganese Cobalt) chemistry, an NCA (Nickel Cobalt Aluminum) chemistry, or an LCO (lithium cobalt oxide) chemistry for a cathode layer, lithium rich layer oxides ($Li_{1+x}M_{1-x}O_2$) (Ni, and/or Mn, and/or Co), (OLO or LMR), spinel ($LiMn_2O_4$) and high voltage spinels ($LiMn_{1.5}Ni_{0.5}O_4$), disordered rock salt, Fluorophosphates $Li_2FePO_4F$ (M=Fe, Co, Ni) and Fluorosulfates $LiMSO_4F$ (M=Co, Ni, Mn) (e.g., the cathode layer 255). Lithium-ion batteries can include a graphite chemistry, a silicon-graphite chemistry, or a lithium metal chemistry for the anode layer (e.g., the anode layer 245). For example, a cathode layer having an LFP chemistry can have a redox potential of 3.4 V vs. $Li/Li^+$, while an anode layer having a graphite chemistry can have a 0.2 V vs. $Li/Li^+$ redox potential.

Electrode layers can include anode active material or cathode active material, commonly in addition to a conductive carbon material, a binder, or other additives as a coating on a current collector (metal foil). The chemical composition of the electrode layers can affect the redox potential of the electrode layers. For example, cathode layers (e.g., the cathode layer 255) can include medium to high-nickel content (50 to 80%, or equal to 80% Ni) lithium transition metal oxide, such as a particulate lithium nickel manganese cobalt oxide ("LiNMC"), a lithium nickel cobalt aluminum oxide ("LiNCA"), a lithium nickel manganese cobalt aluminum oxide ("LiNMCA"), or lithium metal phosphates like lithium iron phosphate ("LFP") and lithium iron manganese phosphate ("LMFP"). Anode layers (e.g., the anode layer 245) can include conductive carbon materials such as graphite, carbon black, carbon nanotubes, and the like. Anode layers can include Super P carbon black material, Ketjen Black, Acetylene Black, SWCNT, MWCNT, graphite, carbon nanofiber, or graphene, for example.

Electrode layers can also include chemical binding materials (e.g., binders). Binders can include polymeric materials such as polyvinylidenefluoride ("PVDF"), polyvinylpyrrolidone ("PVP"), styrene-butadiene or styrene-butadiene rubber ("SBR"), polytetrafluoroethylene ("PTFE") or carboxymethylcellulose ("CMC"). Binder materials can include agar-agar, alginate, amylose, Arabic gum, carrageenan, caseine, chitosan, cyclodextrines (carbonyl-beta), ethylene propylene diene monomer (EPDM) rubber, gelatine, gellan gum, guar gum, karaya gum, cellulose (natural), pectine, poly(3,4-ethylenedioxythiophene) polystyrene sulfonate (PEDOT-PSS), polyacrylic acid (PAA), poly(methyl acrylate) (PMA), poly(vinyl alcohol) (PVA), poly(vinyl acetate) (PVAc), polyacrylonitrile (PAN), polyisoprene (PIpr), polyaniline (PANi), polyethylene (PE), polyimide (PI), polystyrene (PS), polyurethane (PU), polyvinyl butyral (PVB), polyvinyl pyrrolidone (PVP), starch, styrene butadiene rubber (SBR), tara gum, tragacanth gum, fluorine acrylate (TRD202A), xanthan gum, or mixtures of any two or more thereof.

Current collector materials (e.g., a current collector foil to which an electrode active material is laminated to form a cathode layer or an anode layer) can include a metal material. For example, current collector materials can include aluminum, copper, nickel, titanium, stainless steel, or carbonaceous materials. The current collector material can be formed as a metal foil. For example, the current collector material can be an aluminum (Al) or copper (Cu) foil. The current collector material can be a metal alloy, made of Al, Cu, Ni, Fe, Ti, or combination thereof. The current collector material can be a metal foil coated with a carbon material, such as carbon-coated aluminum foil, carbon-coated copper foil, or other carbon-coated foil material.

The electrolyte layer 260 can include or be made of a liquid electrolyte material. For example, the electrolyte layer 260 can be or include at least one layer of polymeric material (e.g., polypropylene, polyethylene, or other material) that is wetted (e.g., is saturated with, is soaked with, receives) a liquid electrolyte substance. The liquid electrolyte material can include a lithium salt dissolved in a solvent. The lithium salt for the liquid electrolyte material for the electrolyte layer 260 can include, for example, lithium tetrafluoroborate ($LiBF_4$), lithium hexafluorophosphate ($LiPF_6$), and lithium perchlorate ($LiClO_4$), among others. The solvent can include, for example, dimethyl carbonate (DMC), ethylene carbonate (EC), and diethyl carbonate (DEC), among others. The electrolyte layer 260 can include or be made of a solid electrolyte material, such as a ceramic electrolyte material, polymer electrolyte material, or a glassy electrolyte material, or among others, or any combination thereof.

In some embodiments, the solid electrolyte film can include at least one layer of a solid electrolyte. Solid electrolyte materials of the solid electrolyte layer can include inorganic solid electrolyte materials (e.g., oxides, sulfides, phosphides, ceramics), solid polymer electrolyte materials, hybrid solid state electrolytes, or combinations thereof. In some embodiments, the solid electrolyte layer can include polyanionic or oxide-based electrolyte material (e.g., Lithium Superionic Conductors (LISICONs), Sodium Superionic Conductors (NASICONs), perovskites with formula $ABO_3$ (A=Li, Ca, Sr, La, and B=Al, Ti), garnet-type with formula $A_3B_2(XO_4)_3$ (A=Ca, Sr, Ba and X=Nb, Ta), lithium phosphorous oxy-nitride ($Li_xPO_yN_z$). In some embodiments, the solid electrolyte layer can include a glassy, ceramic and/or crystalline sulfide-based electrolyte (e.g., $Li_3PS_4$, $Li_7P_3S_{11}$, $Li_2S—P_2S_5$, $Li_2S—B_2S_3$, SnS—$P_2S_5$, $Li_2S—SiS_2$, $Li_2S—P_2S_5$, $Li_2S—GeS_2$, $Li_{10}GeP_2S_{12}$) and/or sulfide-based lithium argyrodites with formula $Li_6PS_5X$ (X=Cl, Br) like $Li_6PS_5Cl$). Furthermore, the solid electrolyte layer can include a polymer electrolyte material (e.g., a hybrid or pseudo-solid state electrolyte), for example, polyacrylonitrile (PAN), polyethylene oxide (PEO), polymethyl-methacrylate (PMMA), and polyvinylidene fluoride (PVDF), among others.

In examples where the electrolyte layer 260 includes a liquid electrolyte material, the electrolyte layer 260 can include a non-aqueous polar solvent. The non-aqueous polar solvent can include a carbonate such as ethylene carbonate, propylene carbonate, diethyl carbonate, ethyl methyl carbonate, dimethyl carbonate, or a mixture of any two or more thereof. The electrolyte layer 260 can include at least one additive. The additives can be or include vinylidene carbonate, fluoroethylene carbonate, ethyl propionate, methyl propionate, methyl acetate, ethyl acetate, or a mixture of any two or more thereof. The electrolyte layer 260 can include a lithium salt material. For example, the lithium salt can be lithium perchlorate, lithium hexafluorophosphate, lithium bis(fluorosulfonyl)imide, lithium bis(trifluorosulfonyl) imide, or a mixture of any two or more thereof. The lithium salt may be present in the electrolyte layer 260 from greater than 0 M to about 1.5 M.

Figure 3:
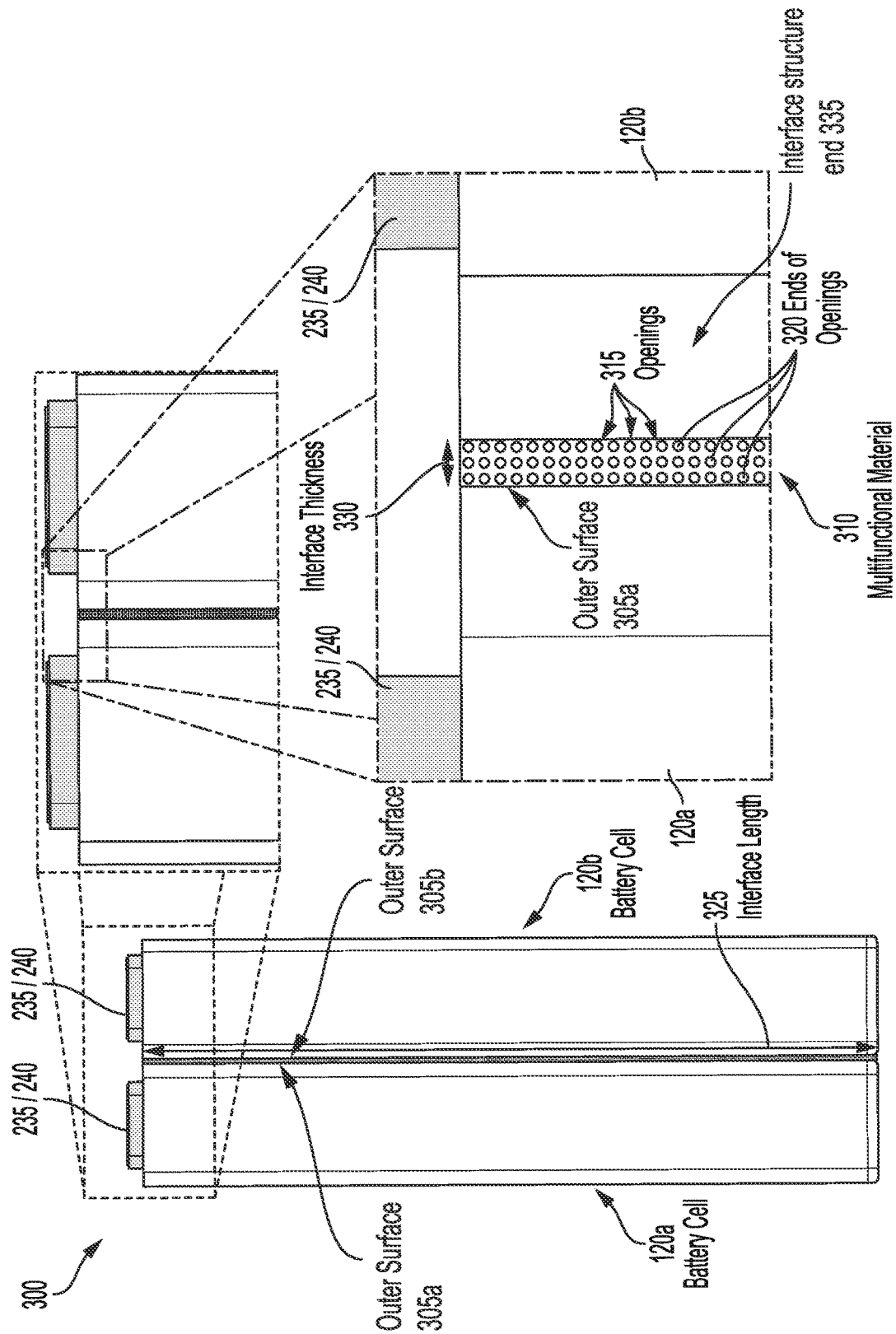
FIG. 3 is a block diagram of a front view of an example battery system with a multifunctional material disposed between two battery cells, in accordance with an embodiment.

FIG. 3 depicts an example battery system 300 in which an interface structure created from a multifunctional material 310 is disposed between and coupled with two battery cells 120 having first polarity terminal 235 and second polarity terminal 240. Battery cell 120a can have an outer surface 305a that is coupled (e.g., in a physical or thermal contact) with the multifunctional material 310 on one side of the multifunctional material 310. On the opposite side of the multifunctional material 310, an outer surface 305b of a battery cell 120b can be coupled (e.g., in a physical or thermal contact) with the multifunctional material 310. Interface structure 310 can have an interface length 325 that can extend along the length of the battery cells 120a and 120b. Interface structure 310 can also include interface thickness 330 that can define the distance apart between the battery cells 120 and 120b. Interface structure 310 can include openings 315 extending through the multifunctional material 310. Opening ends 320 of the openings 315 can be located at the multifunctional material end 335.

For example, the battery system 300 can include, apply or correspond to any number of battery packs 110, battery modules 115 or battery cells 120 in which interface structures 310 can be used to provide thermal or mechanical stress solutions. For example, interface structure 310 can include, or be in part constructed from, metal-organic framework (MOF) material. MOF material can conduct heat to the openings 315 which can extend through the multifunctional material 310 along any one or more directions through which a fluid (e.g., gas or liquid) can be forced, pushed or otherwise move in order to achieve active convection cooling to remove the heat away from the battery (e.g., cells 120, modules 115 or packs 110) via the fluid flowing through openings 315. In the interfaces in which the fluid is not pushed, pumped or otherwise forced through the openings 315, the MOF material of the multifunctional material 310 can provide thermal isolation between the battery cells 120a and 120b, or between any other battery components (e.g., modules 115, packs 110) and any external heat source. For example, the MOF structure can be implemented such that some channels remain empty and include no coolant moving through them at all times in order to more effectively contribute to attending to any mechanical stresses (e.g., vibration, swelling or compression padding), while other channels can be filled with coolant and can be used for active cooling.

Interface structure 310 can further provide mechanical stress absorption, such as shock, vibration, swelling or any other mechanical stress absorption or dampening in order to protect the battery cells 120 from the mechanical stress. As the interface thickness 330 of the multifunctional material 310 is small in comparison with the size of the battery cells 120 (e.g., on the order of one millimeter or less) the multifunctional material 310 can occupy a small amount of volume, thereby providing additional space in the battery pack 110 for additional battery cells 120 or battery modules 115, thereby improving the energy density of the EV battery system 300 (e.g., battery pack 110, battery module 115 or two or more battery cells 120).

Interface structure 310 can be any structure disposed between or interfacing between a battery cell 120, battery module 115 or a battery pack and another component, such as another battery cell 120, battery module 115, battery pack or any other external feature, device or a structure. Interface structure 310 can be disposed between any two or more heat generating components, such as battery cells 120, battery modules 115 or battery packs 110. Interface structure 310 can be disposed on the outer surface of any battery cell 120, battery module 115 or battery pack 110. Interface structure 310 can be disposed next to any external heat source from which battery system 300 can be thermally insulated, such as an electric motor.

Interface structure 310 can include any type and form of thermally conductive material. Interface structure 310 can include porous material, for example a mesoporous material having pores with diameters of between about 2 nm and 50 nm. Interface structure 310 can include macroporous material having material pores larger than 50 nm in diameter. Interface structure 310 can include porous material having pores with diameter smaller than 2 nm.

Interface structure 310 can include a plurality of channels (e.g., openings 315) some of which can be configured or used for thermal management (e.g., have fluid forced through them to conduct the heat away into the fluid), while others can be configured for absorbing mechanical stress (e.g., have no fluid forced through them). For example, interface structure 310 can include openings 315 through which no fluid is forced. Such openings 315 can include fluid (e.g., air) but have no fluid forced through it (e.g., air or water pushed through via a fluid moving device 405), thereby being configured to more effectively absorb mechanical stress (e.g., vibration, swelling or pressure). Other openings 315 can include fluid (e.g., coolant, air or water) pushed through them by the fluid moving device 405 and can therefore be configured to more effectively conduct heat away from the battery via active or forced cooling.

Interface structure 310 can include any type and form of metal-organic framework material. Interface structure 310 can include a material that includes metal ions or clusters that are coordinated to organic ligands or linkers to form two-dimensional or three-dimensional structures. Metal ions can include, for example, ions of any metal, such as aluminum, copper, zinc or iron. Linkers or ligands used in the MOF material can include any bridging ligands, such as, for example, any di- and tricarboxylic acids. Interface structure 310 can include a covalent organic framework (COF) material.

Interface length 325 can include any length of the multifunctional material 310. Interface length 325 can extend along the lengths of the battery calls 120 or battery modules 115 or battery packs 110 with which they can interface or be coupled. Interface length 325 can correspond to the length of the battery cell 120 (or battery module 115 or battery pack 110). Interface length 325 can correspond to a fraction of the length of the battery cell 120 (or battery module 115 or battery pack 110).

Interface thickness 330 can include any thickness of the multifunctional material 330. Interface thickness 330 can correspond to the distance between the two battery cells 120 (e.g., battery cell 120a and battery cell 120b) that are coupled together via the multifunctional material 310. Interface thickness 330 can be about 1 mm. Interface thickness can be less than 1 mm, such as up to 0.9 mm, 0.8 mm, 0.7 mm, 0.6 mm, 0.5 mm or less than 0.5 mm. Interface thickness can be greater than 1 mm, such as up to 1.1 mm, 1.2 mm, 1.3 mm, 1.4 mm, 1.5 mm, 1.7. mm, 2 mm, 2.5 mm, 3 mm, 4 mm, 5 mm, 6 mm, 7 mm, 8 mm, 9 mm, 10 mm or more than 10 mm. Interface thickness 330 can vary based on the size and shape of the battery cells 120. Interface thickness 330 can be thicker in the instance in which thicker battery cells 120 are used. For example, in the event of battery cells having a larger thickness, such as, for example greater than 21 mm by 70 mm, interface thickness 330 can be up to about 10 or 15% of the cell thickness or with (e.g., 7-10 mm), depending on the design. Interface thickness 330 can be between 1 mm and 10 mm, such as for example 1-5 mm.

Openings 315 can include any type and form of openings, cavities or hollow channels through the multifunctional material 310. Openings 315 can include hollow cavities that can be drilled through the multifunctional material 310. The hollow cavities can have side walls and a bottom wall (e.g., not a through hole). Openings 315 can include hollow paths or through-holes that can extend through the entire interface structure 310 and have two open ends (e.g., a first opening or entry and a second opening or exit for the fluid). An opening 315 can begin with an opening end 320 of the opening 315 that can be located at one interface structure end 335. The opening 315 can extend through the multifunctional material 310 and can end at another opening end 320 at the opposite interface structure end 335. For example, if a multifunctional material 310 is shaped as a rectangular prism, the opening 315 (e.g., hollow cavity or a channel) can extend from one face of the rectangular prism, through the rectangular prism-shaped interface structure 310, and to the opposite face of the rectangular prism. In such an example, the opening ends 320 can be on the opposing two faces of the rectangular prism and the two faces can correspond to the multifunctional material ends 335.

Openings 315 can include any length, with or shape. Openings 315 can include a diameter of any size such as, for example, a diameter between 10 micrometers and 1 millimeter. An opening 315 can include a diameter of between about 0.2 millimeters and 0.5 millimeters, or between 0.5 millimeters and 1 millimeters. Different openings 315 can be of the same or a different diameter. For example, all openings 315 of a multifunctional material 310 can have a same diameter, such as, at least 10 um, 50 um, 0.1 mm, 0.2 mm, 0.3 mm, 0.4 mm, 0.5 mm, 0.7 mm or 1 mm. For example, a first opening 315 of a multifunctional material 310 can have a diameter of 0.2 mm, while a second opening 315 of the same interface structure 310 can have a diameter of 0.5 mm. For example, openings 315 can have diameters that are less than 0.2 mm, such as 0.1 mm, or less. For example, openings 315 can include a diameter larger than 0.5 mm, such as 0.6 mm, 0.7 mm, 0.8 mm, 0.9 m or 1 mm. For example, openings 315 can include a cross-section of any shape, such as a circular diameter, an elliptical diameter, a hexagonal diameter, or any shape of the cross-section, such as any polygon, for example.

For example, openings 315 can extend horizontally, vertically, diagonally, in one or in more directions, from one multifunctional material end 335 to the other multifunctional material end 335. Openings 315 can extend vertically, horizontally or diagonally from a first multifunctional material end 335 on the left side to the multifunctional material end 335 on the right side of the MOF structure. Openings 315 can extend along a same direction (e.g., vertically, horizontally, diagonally) along the entire length of the MOF structure (e.g., from one end 335 to the opposite end 335). Openings 315 can extend from one multifunctional material end 335 of the MOF structure to an end of the multifunctional material structure 335 that is adjacent to it (e.g. channels extending from one side to adjacent sides).

Figure 4:
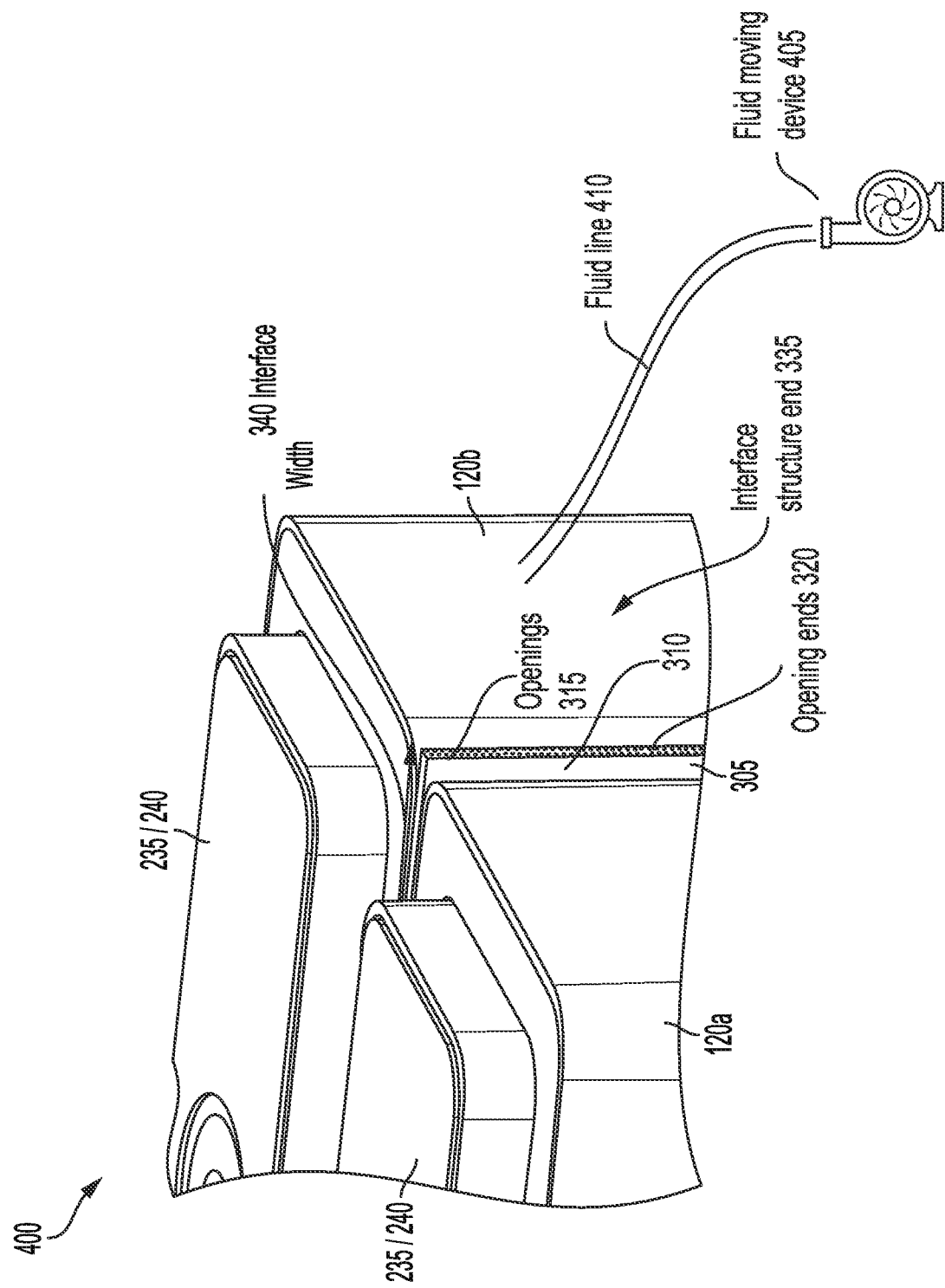
FIG. 4 is a block diagram of a perspective view of an example battery system with a multifunctional material disposed between two battery cells, in accordance with an embodiment.

FIG. 4 depicts an example of the battery system 400 from a perspective angle. The battery system 400 can include a fluid moving device 405 for moving the fluid through openings 315 of the multifunctional material 310 of the battery system 400. Fluid moving device 405 can provide or couple the fluid into openings 315 via a fluid line 410. The battery system 400 can include battery cells 120a and 120b interfaced together via the multifunctional material 310 through which openings 315 can extend between two the multifunctional material ends 335. Battery cells 120a and 120b can each have positive or negative terminals 235 and 240. Interface 310 can have an interface width 340 which can extend perpendicularly to the interface length 325 and interface thickness 330 (e.g., shown in FIG. 3). Using the fluid (e.g., liquid or gas) forced, moved or pushed through the fluid line 410 by the fluid moving device 405, the multifunctional material 310 can provide thermal cooling via forced convection to the battery cells 120a and 120b. For example, battery cells 120a and 120b can generate heat which can be conducted to the multifunctional material 310, from which the heat can be dissipated, via the moving fluid in the openings 315, out of the battery system 400.

Fluid moving device 405 can include any device, system or component moving fluid. Fluid moving device 405 can include a fan or a pump. Fluid moving device 405 can include a device or a system for moving a gas, such as air. Fluid moving device 405 can include a pump, such as a water or a coolant pump. Fluid can include liquid, such as water, oil or coolant liquid. Fluid can include gas, such as air, nitrogen, oxygen. Fluid moving device 405 can include a high pressure pump which can move or push the fluid into the openings 315 at a pressure that is above the ambient pressure, such as 2, 5, 10, or more than 10 times the ambient pressure. Fluid moving device 405 can provide fluid to the openings 315 such that the different in pressure between the ends 320 of openings 315 at the beginning and the end of the openings 315 is anywhere between 100 Pascals (Pa) and 2000 Pa, such as up to 100 Pa, 200 Pa, 500 Pa, 800 Pa, 1000 Pa, 1500 Pa, 2000 Pa, 3000 Pa, 5000 Pa, 10 kilo-Pascals (kPa), 20 kPa, 30 kPa, 40 kPa, 50 kPa, 60 kPa, 70 kPa, 80 kPa, 90 kPa, 100 kPa or more than 100 kPa. For example, a fluid moving device can move or push the fluid through the openings 315 of the interface structure 310 at a pressure of between about 1 kPa and about 100 kPa.

Fluid line 410 can be any conduit through which fluid can be delivered from the fluid moving device 405 to the openings 315. Fluid line 410 can include a gas line, a water line or any other line comprising material suitable for conducting the fluid. Fluid line 410 can include fluid couplers for coupling the fluid into the openings 315 of the interface 310.

Figure 5:
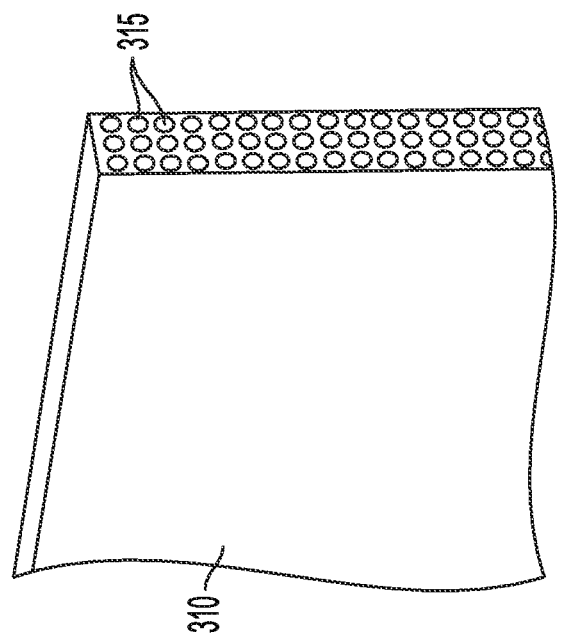
FIG. 5 is a block diagram of an example multifunctional material, in accordance with an embodiment.
Figure 5:

FIG. 5 depicts an example 500 of a multifunctional material 310. Interface structure 310 can include a shape of a rectangular prism, where openings (e.g., channels or through-hole cavities) can be drilled. The openings 315 can facilitate mechanical pressure absorption by allowing for compression of the multifunctional material 310 in the openings 315. As such, the openings 315 can serve as features that fine tune and facilitate the performance of the multifunctional material 310 as the mechanical stress absorption interface. For example, larger diameter openings 315 can allow for increased compression or increased softness or ability of the multifunctional material 310 to absorb mechanical pressure. For example, smaller diameter openings 315 can allow for decreased compression or decreased softness or ability of the multifunctional material 310 to absorb mechanical pressure.

Figure 6:
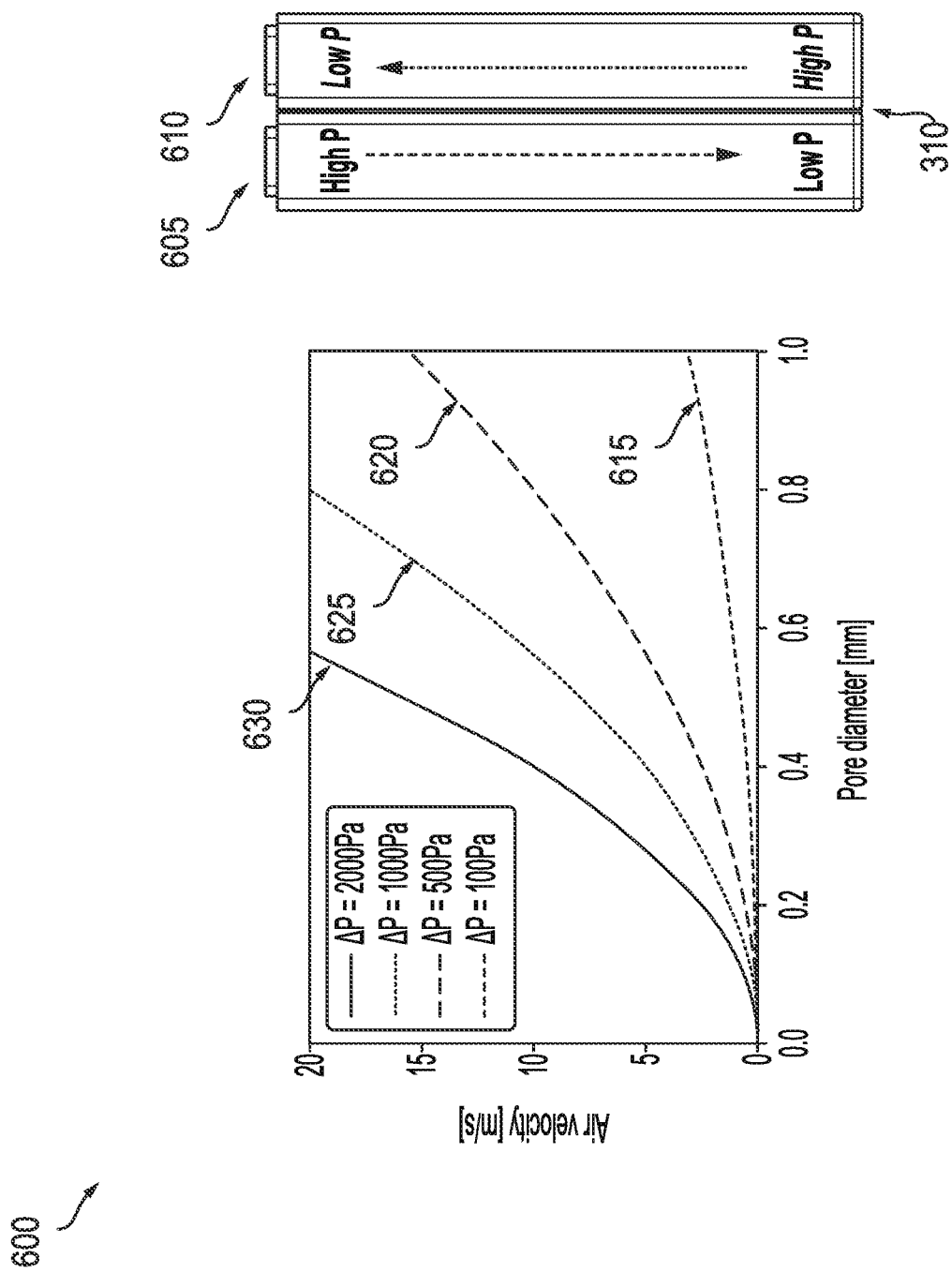
FIG. 6 is a block diagram of plots and illustrations corresponding to air flow through the multifunctional material, in accordance with an embodiment.

FIG. 6 depicts an example of a graph 600 of four plots of an air velocity in the openings 315 measured in meters per second as a function of a diameter of opening 315 in millimeters. Examples 605 and 610 illustrate battery cells coupled with a multifunctional material 310 in which a high pressure to a low pressure differential is shown both in the upward and downward directions. For example, the openings 315 in the multifunctional material 310 of examples 605 and 610 can be oriented in the vertical direction, some of them having fluid forced in a downward direction (e.g., a high pressure above and a low pressure below) and some of them having their fluid forced in an upward direction (e.g., a high pressure below and a low pressure above) As shown in the graph 600, a plot 615 corresponds to a difference in pressure between the two ends of the openings 315 of 100 Pa. In plot 615, at about 0.5 mm diameter of the opening 315 the air velocity is at about 1 m/s. In a plot 620, that corresponds to a difference in pressure between the two ends of the openings 315 of 500 Pa, at about 0.5 mm diameter of the opening 315 the air velocity is about between 3 and 4 m/s. In a plot 625, that corresponds to a difference in pressure between the two ends of the openings 315 of 1000 Pa, at about 0.5 mm diameter of the opening 315 the air velocity is about between 7 and 8 m/s. In a plot 630, that corresponds to a difference in pressure between the two ends of the openings 315 of 2000 Pa, at about 0.5 mm diameter of the opening 315 the air velocity is about between 17 and 18 m/s. Therefore, the diameter of the opening 315 allows for a faster air velocities at lower difference in pressure between the two ends of the openings 315

In some aspects, the present solution relates to an apparatus or a system, such as a battery system 300 that can include a multifunctional material 310 that can provide one or more thermal or mechanical functions. For example, the present solution can include an apparatus that can include a battery cell 120. The apparatus can also include a battery module 115 or a battery pack 110. The battery cell 120 (or the battery module 115 or battery pack 110) can include an outer surface 305. The apparatus can include a multifunctional material 310 that can be coupled with the outer surface 305 of the battery cell 120 (or the battery module 115 or battery pack 110). The multifunctional material 310 can be included into battery cell 120 (or battery module 115 or battery pack 110) and form a part of the enclosure or a package. The apparatus can include an opening 315 that extends through the multifunctional material 310. Opening 315 may extend through the multifunctional material 310 in various ways. For example, opening 315 may be a horizontal opening that spans the length of the cells 120a and b. Further, opening 315 may be vertical opening that spans the height of the cells 120a and b, diagonal, and/or a combination thereof. In addition, the opening 315 may include a channel from cell 120a to cell 120b.

Heat can be thermally conducted from the battery cell 120, battery module 115 or battery pack 110 to the multifunctional material 310, from which it can be dissipated through thermal forced convection caused by forced fluid through one or more openings 315 of the multifunctional material. Heat can also be insulated, trapped or stopped by the multifunctional material 310 when fluid is filled but not moving within the openings 315, such as when air fills the openings 315, but is not being moved through the openings 315.

A cooling plate can be integrated with or into the interface structure of the multifunctional material 310. For example, a cooling plate that is cooled by a moving fluid (e.g., water or air) can be integrated into the multifunctional material 310 and can run through the multifunctional material 310. The cooling plate can include one or more flow paths through which fluid can flow. The flow paths can include openings, such as openings 315.

The multifunctional material 310 can be coupled to the outer surface 305 via physical contact, a thermal contact, a contact through one or more intermediary components or parts. The intermediary components and parts can be thermally conductive or thermally insulative, depending on the configuration. For example, when a side of battery cell 120, module 115 or pack is exposed to an external heat source from which it needs to be insulated, thermally insulative intervening layer can be included between the battery component and the multifunctional material 310. Alternatively or additionally, when a side of a battery cell 120, module 115 or pack 110 is exposed to another heat generating battery cell 120, module 115 or pack 110, thermally conductive intervening layer can be included between the battery component and the multifunctional material 310.

The apparatus can include a plurality of openings 315. The plurality of openings 315 can include the opening 315. The plurality of openings 315 can extend through the multifunctional material 310. The multifunctional material 310 can include a metal-organic framework (MOF) material. The multifunctional material 310 can be in thermal communication with the outer surface 305. The multifunctional material 310 can be configured to conduct heat away from the battery cell 120 (or the battery module 115 o or the battery pack 110) in response to a fluid being moved through the plurality of openings 315. The multifunctional material 310 can include a single opening 315 and the fluid can be moved by the fluid moving device through the opening 315. The multifunctional material 310 can be configured to provide thermal insulation to the battery cell 120 in response to the fluid not being moved through the one or a plurality of openings 315. The multifunctional material 310 can be configured to absorb mechanical energy from the battery cell 120 (or the battery module 115 or battery pack 110).

The MOF material that can be included in the multifunctional material 310 can be mesoporous. The MOF material can have a thermal conductivity of at least one watt per meter kelvin (1 W/mK). The thermal conductivity of the MOF material can be between 0.1 W/mK and 1 W/mK, such as up to 0.05 W/mK, 0.1 W/mK, 0.2 W/mK, 0.3 W/mK, 0.4 W/mK, 0.5 W/mK, 0.6 W/mK, 0.7 W/mK, 0.8, W/mK, 0.9 W/mK or 1 W/mK. The MOF material can have a thermal conductivity of greater than 1 W/mK, such as up to 1.2 W/mK, 1.5 W/mK, 1.8 w/mK, 2 W/mK, 3 W/mK, 5 W/mK, 10 W/mK, 20 W/mK, or more than 20 W/mK. The MOF material can have a thermal conductivity of between 0.1 and 1.0 W/mK, such as about 0.3-0.9 W/mK, depending on the design (e.g., number of channels, porosity, or the amount of material used in the structure).

The thermal conductivity of MOF can be selected or tuned to address a thermal runaway. For example, to delay the propagation of a thermal runaway, the thermal conductivity of the material can be selected to be on the order of about 1 W/mK for the structure. The pore structure of the MOF structure can allow the dissipation of excessive heat generated during thermal runaway, and the low heat conductivity of MOF can delay thermal runaway propagation. Temperature uniformity between cells will be achieved via temperature of fluid flowing into the MOF being same at the manifold of the inlet of cooling system.

The multifunctional material 310 can include a thickness 330 of the multifunctional material 310 that is not greater than one millimeter. The thickness 330 can be perpendicular to a length of the multifunctional material 310 extending along a length of the outer surface and to a width of the multifunctional material extending along a width of the outer surface. The apparatus can include a fluid moving device 405 to cause a fluid to flow into a first end 320 of the opening 315 at a first end 335 of the multifunctional material and flow out of the opening 315 through a second end 320 of the opening 315 at a second end 335 of the multifunctional material 310. The fluid can be at least one of a gas or a liquid. The opening 315 can extend perpendicular to the thickness 330 of the multifunctional material 315. The opening 315 can include interior diameter that is between about 0.2 millimeters and 0.5 millimeters.

The fluid can include a gas that is moved by the fluid moving device 405. The fluid moving device 405 moving the gas (e.g., fluid) can cause the difference in pressure between the gas at the first end and the second end to be between 100 Pascals and 2000 Pascals. The interface structure or the multifunctional material 310 can be configured to move the fluid through the opening 315 at a velocity of between 0.5 and 20 meters per second. The multifunctional material 310 can include a MOF material. The multifunctional material 310 can include a plurality of pores that impede air movement. The multifunctional material 310 can thermally insulate the battery cell from a second battery cell that is coupled with the multifunctional material.

The multifunctional material 310 can be configured to absorb swelling from the battery cell during operation of the battery cell. The battery cell 120 can be included by or within a battery module 115. The battery module 115 can include the multifunctional material 315 disposed between and in thermal communication with the battery cell 120 and the second battery cell 120. The battery module 115 can be comprised by a first battery pack 110. The first battery pack 110 can include a second battery module. The second battery module 115 can include a third battery cell 120 having a third outer surface 305 and a second interface structure 310 in thermal communication with the third outer surface 305. The second battery module 115 can include a second opening 315 extending through the second interface structure 310. The second interface structure 310 can be configured to conduct heat away from the third battery cell 120 in response to a fluid being moved through the second opening 315. The second interface structure 310 can be configured to provide thermal insulation to the third battery cell 120 in response to the fluid not moved through the second opening 315. The second interface structure 310 can be configured to absorb mechanical energy from the third battery cell. The apparatus can include the second battery module 115 that includes a fourth battery cell. The second interface structure can be disposed between, and in thermal communication with, the third battery cell 120 and the fourth battery cell 120. The battery pack 110 can include a third interface structure that is disposed between, and in thermal communication with, the first battery module 115 and the second battery module 115. The third interface structure 310 can include a third opening 315 extending through the third interface structure 310.

In some aspects, the present disclosure relates to an electric vehicle 105 that can include a battery pack 110 of an electric vehicle. The battery pack 110 can include a first battery cell 120 having a first outer surface 305 and a second battery cell 120 having a second outer surface 305. The battery pack 110 can include a multifunctional material 310 disposed between the first outer surface 305 of the first battery cell 120 and the second outer surface 305 of the second battery cell 120. The multifunctional material 310 can be in thermal communication with the first battery cell 120 and the second battery cell 120. The battery pack can include a plurality of openings 315 extending through the multifunctional material 310 from a first plurality of ends 320 of the plurality of openings 315 at a first end 335 of the multifunctional material 310 to a second plurality of ends 320 of the plurality of openings 315 at a second end 335 of the multifunctional material 315. The multifunctional material 310 can be configured to provide a thermal function. The thermal function can include one of conducting heat away from at least one of the first battery cell 120 or the second battery cell 120. The thermal function can include conducting the heat away in response to a fluid being moved through the plurality of openings 315 by a fluid moving device 405. The thermal function can include thermally insulating at least one of the first battery cell 120 or the second battery cell 120. The thermal insulation can be provided in response to the fluid not being moved through the plurality of openings 315 by the fluid moving device 405. The multifunctional material 310 can be configured to provide a mechanical function. The mechanical function can include absorbing mechanical energy from at least one of the first battery cell 120 or the second battery cell 120. Absorbing mechanical energy can include, for example, absorbing, dampening or insulating vibrations, inflections, pressure or movement of the battery cells 120, modules 115 or packs 110.

Figure 7:
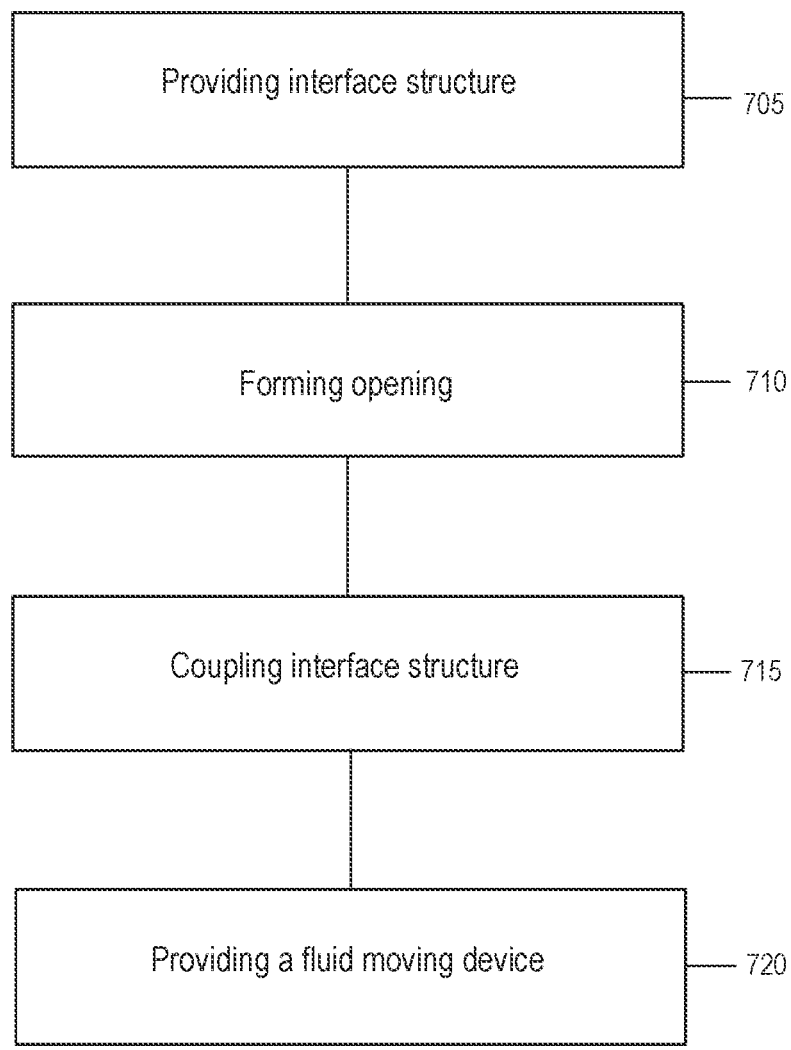
FIG. 7 is a flow diagram of an example method of providing a multifunctional interface structure using the multifunctional material, for example, the system depicted in FIGS. 3-4.

FIG. 7 illustrates an example flowchart of a method 700 of providing, to a battery system, a multifunctional interface structure for thermal cooling, thermal isolation and mechanical stress absorption. Method 700 can include ACTS 705-720. The method 700 can be performed, for example, by one or more components of the battery system, such as those in the examples that are illustrated and discussed in connection with FIGS. 3-6. At ACT 705, interface infrastructure is provided. At ACT 710, opening is formed. At ACT 715, interface structure is coupled. At ACT 720, providing a fluid moving device.

At ACT 705, the method 700 can include providing an interface structure. The method can include providing the multifunctional material that includes a metal-organic framework (MOF) material. The method can include providing the multifunctional material comprising a mesoporous material. The method can include providing the multifunctional material that has a thermal conductivity of at least one watt per meter kelvin (1 W/mK). Thermal conductivity of the material can be anywhere between 0.5 W/mK to up to 100 W/mK. The multifunctional material can be provided on or within the outer surface of the battery cell, battery module or the battery pack. Interface structure can be provided disposed between one or more battery cells, battery modules or battery packs.

The multifunctional material can be shaped as a rectangle, square, sphere or any other shape. The multifunctional material can include a length that extends up to the length of the battery cell. The multifunctional material can include a width that extends up to the width of the battery cell. The multifunctional material can include a thickness that is perpendicular to the length and the width of the multifunctional material. The thickness of the multifunctional material can be about one millimeter. The method can include the multifunctional material having a thickness of less than one millimeter, such as up to 0.9 mm, 0.8 mm, 0.7 mm, 0.6 mm, 0.5 mm, 0.4 mm, 0.3 mm, 0.2 mm or 0.1 mm. The method can include the multifunctional material having a thickness of more than one millimeter, such as up to 1.5 mm, 2 mm, 3 mm, 4 mm, 5 mm or more than 5 mm.

At ACT 710, the method 700 can include forming an opening. The method can include forming an opening that extends through the multifunctional material. The opening can be formed so as to extend through the length of the multifunctional material or the width of the multifunctional material. The opening can be formed so as to extend through any angle between the length and the width of the multifunctional material, such as diagonally across a rectangular interface structure. The opening can be formed so as to be perpendicular to the thickness of the multifunctional material.

The method can include forming a plurality of openings extending through the multifunctional material. The plurality of openings can each have a diameter of between 0.2 millimeters and 0.5 millimeters, such as up to 0.2 mm, 0.3 mm, 0.4 mm or 0.5 mm. Each of the openings can have a diameter that is larger than 0.5 mm in diameter. Openings can have a cross-section of any shape. Openings can be shaped as triangles, squares, ellipses, circles, rectangles, hexagons, octagons or any other polygon.

At ACT 715, the method 700 can include coupling the multifunctional material. The method can include thermally coupling the multifunctional material with a battery cell. The method can include thermally coupling the multifunctional material with a battery module or a battery pack. The method can include thermally coupling the multifunctional material via one or more intervening thermally conductive or thermally insulative layers, components or features. The method can include coupling the multifunctional material with the outer surface of the battery cell, module or pack by placing the multifunctional material in a physical contact with the battery cell, module or pack. The multifunctional material can be glued, attached, screwed or otherwise adhered to the battery cell, module or pack. The interface structure comprising the multifunctional material can include a cooling plate. The cooling plate can include a fluid (e.g., water or air) cooled plate. The cooling plate can be integrated within or next to the multifunctional material. The cooling plate can run through the multifunctional material.

At ACT 720, the method 700 can provide a fluid moving device. The method can include providing a fluid moving device in a fluid communication with the opening of the multifunctional material. The fluid device can be or include a fan for blowing air, a pump for pumping fluid (gas or liquid) or any other fluid moving device. The fluid moving device can be in fluid communication with the end of the opening in order to couple the fluid into the opening. The fluid moving device can move the fluid through the opening.

The method can include providing one of a thermal function or a mechanical function via the multifunctional material. The method can include providing the thermal function of one of a thermal cooling of the battery in response to a fluid moving device moving a fluid through the opening, or thermally insulating the battery in response to the fluid moving device not moving the fluid through the opening. The method can include the multifunctional material conducting heat away from the battery cell in response to the fluid moving device moving a fluid through the plurality of openings. The method can include the multifunctional material thermally insulating the battery cell in response to the fluid moving device not moving the fluid through the plurality of openings.

The method can include absorbing, by the MOF material, mechanical energy from the first battery cell. The method can include providing the mechanical function of absorbing, by the multifunctional material, mechanical energy from the battery cell. The mechanical energy absorbed can include vibrations, pressure, inflections and movements of the battery cells, modules or packs, or of objects around the cells, modules or packs.

The method can include forming the multifunctional material having a thickness that is not greater than one millimeter. The multifunctional material can be configured to absorb swelling of the battery cell during operation of the battery cell. The multifunctional material can be configured to provide one of a thermal cooling caused by a fluid being moved through the opening by the fluid moving device or a thermal insulation caused by the fluid not being moved through the opening by the fluid moving device. The fluid can be a gas. The opening can extend perpendicular to a thickness of the multifunctional material.

The method can include causing, by the fluid moving device, a difference in pressure between the gas at a first end of the opening at a first end of the multifunctional material and the gas at a second end of the opening at the second end of the multifunctional material to be between 100 Pascals and 2000 Pascals. The method can include moving, by the fluid moving device, the gas through the opening at a velocity of between 0.5 and 20 meters per second.

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, descriptions of positive and negative electrical characteristics may be reversed. For example, terminals 235 or 240 can be reversed. Elements described as negative elements can instead be configured as positive elements and elements described as positive elements can instead by configured as negative elements. For example, elements described as having first polarity can instead have a second polarity, and elements described as having a second polarity can instead have a first polarity. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. An apparatus, comprising:
  a battery cell having an outer surface;
  a multifunctional material comprising a metal-organic framework (MOF) material coupled with the outer surface; and
  an opening that extends through the MOF material, the opening comprising a diameter that is approximately between 0.1 micrometers and 1 millimeter.

2. The apparatus of claim 1, comprising:
  a plurality of openings comprising the opening, the plurality of openings extending through the MOF material from a first end of the MOF material to a second end of the MOF material; and
  the multifunctional material in thermal communication with the outer surface and configured to:

conduct heat away from the battery cell in response to a fluid being moved through the plurality of openings;

provide thermal insulation to the battery cell in response to the fluid not being moved through the plurality of openings; and absorb mechanical energy from the battery cell.

3. The apparatus of claim 2, wherein the MOF material is mesoporous and has a thermal conductivity of up to one watt per meter kelvin (1 W/mK).

4. The apparatus of claim 1, comprising:
the multifunctional material having a thickness that is between 1 and 5 millimeters, wherein the opening comprises a length that spans one of a length or a width of the battery cell.

5. The apparatus of claim 1, comprising:
a fluid moving device to cause a fluid to flow into a first end of the opening at a first end of the multifunctional material and flow out of the opening through a second end of the opening at a second end of the multifunctional material.

6. The apparatus of claim 1, wherein a fluid in the opening is at least one of a gas or a liquid and wherein the opening extends perpendicular to a thickness of the multifunctional material.

7. The apparatus of claim 1, wherein a fluid is a gas and a fluid moving device causes a difference in pressure between the gas at a first end of the opening and a second end of the opening to be between 100 Pascals and 100 kilo-Pascals.

8. The apparatus of claim 5, wherein the apparatus is configured to move the fluid through the opening at a velocity of between 0.5 and 20 meters per second.

9. The apparatus of claim 1, wherein the battery cell is a first battery cell, comprising:
the MOF material having a plurality of pores that impede air movement; and
the multifunctional material thermally insulates the battery cell from a second battery cell that is coupled with the multifunctional material and absorbs mechanical energy from at least one of the battery cell or the second battery cell.

10. The apparatus of claim 1, comprising:
the multifunctional material configured to absorb swelling from the battery cell.

11. The apparatus of claim 1, wherein the battery cell is a first battery cell, comprising:
a battery module, the battery module including the multifunctional material disposed between and in thermal communication with the battery cell and a second battery cell.

12. The apparatus of claim 11, wherein the battery module is a first battery module, comprising:
a first battery pack, the first battery pack including a second battery module, the second battery module comprising:
a third battery cell having a third outer surface;
a second interface structure in thermal communication with the third outer surface; and
a second opening extending through the second interface structure, the second interface structure configured to:
conduct heat away from the third battery cell;
provide thermal insulation to the third battery cell; and
absorb mechanical energy from the third battery cell.

13. The apparatus of claim 12, comprising:
the second battery module including a fourth battery cell; and the second interface structure disposed between and in thermal communication with the third battery cell and the fourth battery cell.

14. The apparatus of claim 13, comprising:
the battery pack including a third interface structure disposed between and in thermal communication with the first battery module and the second battery module, the third interface structure comprising a third opening that extends through the third interface structure.

15. A method, comprising:
providing a multifunctional material comprising a metal-organic framework (MOF) material;
forming an opening extending through the MOF material, the opening comprising a diameter that is approximately between 0.1 micrometers and 1 millimeter;
coupling the multifunctional material with a battery cell; and
providing a fluid moving device in a fluid communication with the opening.

16. The method of claim 15, comprising:
providing the thermal function of one of a thermal cooling of the battery cell in response to the fluid moving device moving a fluid through the opening, or thermally insulating the battery in response to the fluid moving device not moving the fluid through the opening; and
providing the mechanical function of absorbing, by the multifunctional material, mechanical energy from the battery cell.

17. The method of claim 15, comprising:
providing the multifunctional material comprising a mesoporous material that has a thermal conductivity of up to one watt per meter kelvin (1 W/mK); and
forming a plurality of openings extending through the multifunctional material and comprising the opening, the plurality of openings each comprising diameters of between 0.1 micrometers and 1 millimeter.

18. The method of claim 15, comprising:
forming the multifunctional material comprising a thickness of between about one and five millimeters, wherein the multifunctional material is configured to absorb swelling of the battery cell during operation of the battery cell and provide one of a thermal cooling caused by a fluid being moved through the opening by a fluid moving device and a thermal insulation caused by the fluid not being moved through the opening by the fluid moving device.

19. The method of claim 18, wherein the fluid is a gas and wherein the opening extends perpendicular to the thickness of the multifunctional material, comprising:
causing, by the fluid moving device, a difference in pressure between the gas at a first end of the opening at a first end of the multifunctional material and the gas at a second end of the opening at a second end of the multifunctional material to be between 100 Pascals and 100 kilo-Pascals; and
moving, by the fluid moving device, the gas through the opening at a velocity of between 0.5 and 20 meters per second.

20. An electric vehicle, comprising:
a battery pack comprising:
a first battery cell having a first outer surface;
a second battery cell having a second outer surface;
an interface structure formed using a multifunctional material is disposed between the first outer surface and the second outer surface and in thermal communication with the first battery cell and the second battery cell, wherein the multifunctional material comprises a metal-organic framework (MOF) material; and a plurality of openings extending through the interface structure from a first plurality of ends of the plurality of openings at a first end of the interface structure to a second plurality of ends of the plurality of openings at a second end of the interface structure, wherein the interface structure is configured to absorb mechanical energy from at least one of the first battery cell or the second battery cell and one of:
   (i) conduct heat away from at least one of the first battery cell or the second battery cell using fluid moved through the plurality of openings by a fluid moving device, and
   (ii) thermally insulate at least one of the first battery cell or the second battery cell in response to the fluid not being moved through the plurality of openings by the fluid moving device.

* * * * *